C. D. Mansfield,
Mower.
No. 88,650.
Patented April 6, 1869.

WITNESSES
Joh. Becker
Thos. A. Bryan

INVENTOR
C. D. Mansfield
pr. [signature]
Attorneys

UNITED STATES PATENT OFFICE.

CHARLES D. MANSFIELD, OF LYNN, MASSACHUSETTS.

IMPROVEMENT IN MOWING-MACHINES.

Specification forming part of Letters Patent No. 88,650, dated April 6, 1869.

*To all whom it may concern:*

Be it known that I, CHARLES D. MANSFIELD, of Lynn, Essex county, Massachusetts, have invented a new and Improved Mowing-Machine; and I do hereby declare that the following is a full, clear, and exact description thereof, which will enable others skilled in the art to make and use the same, reference being had to the accompanying drawings, forming part of this specification, in which—

Figure 1:
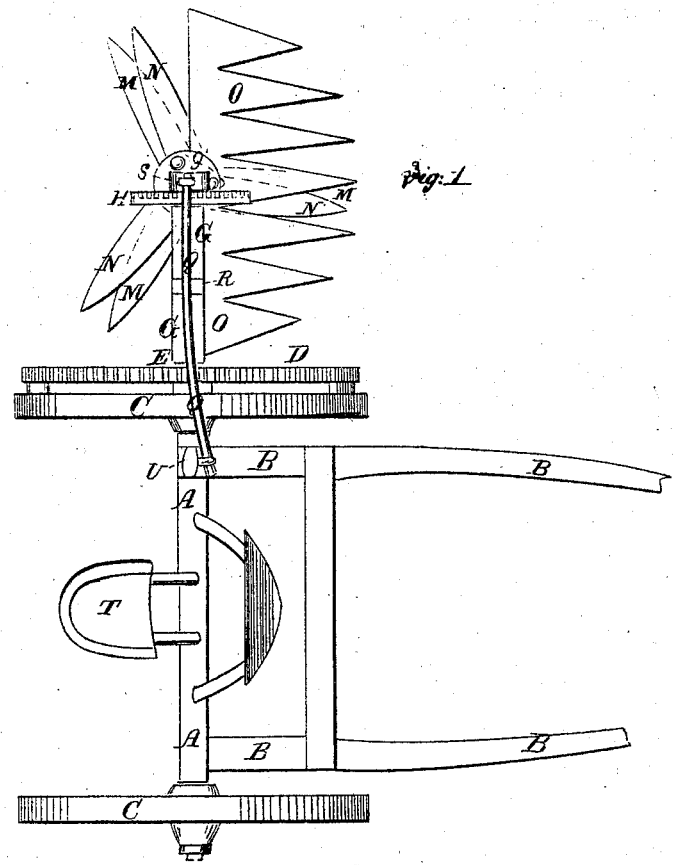
Figure 2:
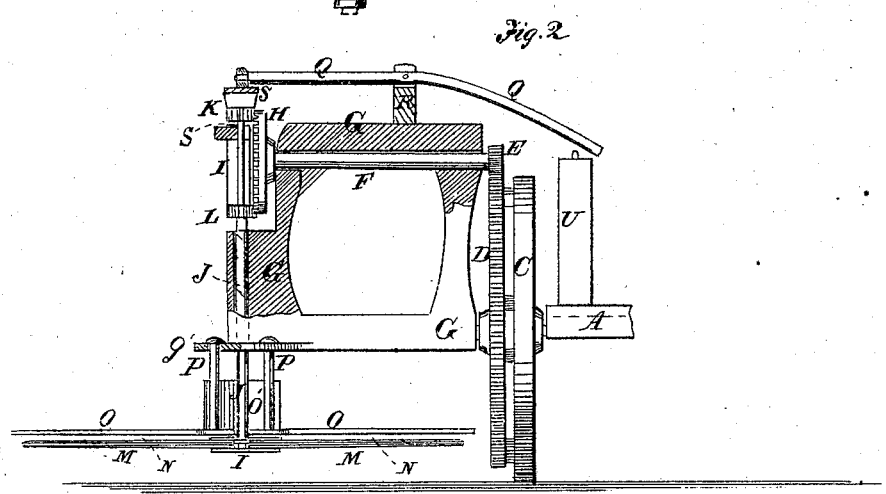

Figure 1 is a top view of my improved machine. Fig. 2 is a partial rear view of the same, partly in section, to show the construction.

Similar letters of reference indicate corresponding parts.

My invention has for its object to furnish a neat, simple, convenient, and effective mowing-machine, which shall be so constructed and arranged that, while doing its work quickly and thoroughly, it will have less side draft and less wear and tear of the machinery than mowing-machines constructed in the ordinary manner; and it consists in the construction and combination of various parts of the machine, as hereinafter more fully described.

A is the axle, to which the shafts B are securely and rigidly attached, and upon the journals of which the wheels C revolve loosely. To one of the wheels C is attached, or upon it is formed, a large gear-wheel, D, into the teeth of which mesh the teeth of the small gear-wheel, E, rigidly attached to the end of the shaft F. The shaft F revolves in bearings in the upper part of the frame G, which is securely attached to the projecting end of the journal of the axle A. To the outer end of the shaft F is rigidly attached a crown-wheel, H, as shown in Fig. 2.

I is a vertical shaft, which passes down vertically through the hollow shaft J, and to its upper end is attached a small gear-wheel, K, the teeth of which mesh into the teeth of the crown-wheel H at the upper part of said wheel H. To the upper end of the hollow shaft J is attached a small gear-wheel, L, the teeth of which mesh into the teeth of the crown-wheel H at the lower part of said wheel H, the hollow shaft J being made of such a length as to bring the said wheel L into the desired position. The interior shaft, I, and exterior hollow shaft, J, revolve in bearings attached to the outer part of the frame G. To the lower end of the shaft I are attached three or more radial knives, M, and to the lower end of the hollow shaft J is attached an equal number of similar radial knives N. The knives M and N are revolved in opposite directions, and are so formed that they may work together in cutting the grass or grain in the manner of shear-blades.

O is a plate, which is toothed, as shown in Fig. 1, to collect the grass or grain, guide it into proper position to be acted upon by the knives M and N, and hold it while being cut by said knives. The plate O is loosely connected to the base-flange $g'$ of the frame G by bolts or rods P, so that the said plate O may be raised and lowered with the shafts I and J and knives M N, and so that it may readily adjust itself to variations of the surface of the ground over which the machine is passing. The middle part of the toothed plate O, through a slot in which the shafts I and J pass, is provided with an upwardly-projecting flange, $o'$, surrounding the front and sides of said shafts, and protecting them from becoming entangled and clogged with the cut grass or grain.

Q is a lever, which is pivoted to the standard R attached to the frame G, and the outer end of which is connected with the shaft I by the stirrup S, as shown in Fig. 2, so that by operating the lever Q the shafts I J, knives M N, and toothed plate O may be raised away from the ground, and at the same time thrown out of gear with the wheel H, so that the machine may be drawn from place to place without operating the said knives M N. The inner end of the lever Q extends inward into such a position that it may be conveniently reached and operated by the driver from his seat T.

U is a standard attached to the frame or axle of the machine in such a position that the inner end of the lever Q may be caught upon a catch attached to said standard to hold the knives M N and plate O away from the ground for any desired length of time.

Having thus described my invention, what I claim as new, and desire to secure by Letters Patent, is—

1. The combination of the gear-wheels D and E, shaft F, gear-wheels H, K, and L, vertical shaft I, and vertical hollow shaft J with each other and with the radial knives M and N, frame G, and wheel C, substantially as herein shown and described, and for the purpose set forth.

2. The toothed plate O, constructed and connected with the frame G, substantially as herein shown and described, in combination with the radial knives M and N and shafts I and J, as and for the purpose set forth.

The above specification of my invention signed by me this 17th day of December, 1868.

CHAS. D. MANSFIELD.

Witnesses:
L. Dow Stanley,
Samuel B. Short.